United States Patent [19]

Kumar et al.

[11] Patent Number: 5,133,785
[45] Date of Patent: Jul. 28, 1992

[54] SEPARATION OF MULTICOMPONENT GAS MIXTURES BY SELECTIVE ADSORPTION

[75] Inventors: Ravi Kumar, Allentown; Wilbur C. Kratz, Macungie, both of Pa.

[73] Assignee: Air Products and Chemicals, Inc., Allentown, Pa.

[21] Appl. No.: 661,045

[22] Filed: Feb. 26, 1991

[51] Int. Cl.$^5$ ............................................. B01D 53/04
[52] U.S. Cl. ............................................. 55/26; 55/58; 55/62; 55/68; 55/74
[58] Field of Search ................... 55/25, 26, 33, 58, 62, 55/68, 74, 75

[56] References Cited

U.S. PATENT DOCUMENTS

| | | | |
|---|---|---|---|
| Re. 31,014 | 8/1982 | Sircar | 55/26 |
| 3,986,849 | 10/1976 | Fuderer et al. | 55/25 |
| 4,171,206 | 10/1979 | Sircar | 55/26 |
| 4,171,207 | 10/1979 | Sircar | 55/26 |
| 4,650,500 | 3/1987 | Patel | 55/26 |
| 4,790,858 | 12/1988 | Sircar | 55/26 |
| 4,813,980 | 3/1989 | Sircar | 55/26 |
| 4,913,709 | 4/1990 | Kumar | 55/26 |
| 4,914,218 | 4/1990 | Kumar et al. | 55/26 |

*Primary Examiner*—Robert Spitzer
*Attorney, Agent, or Firm*—Robert J. Wolff; James C. Simmons; William F. Marsh

[57] ABSTRACT

Multicomponent gas mixtures containing: (1) hydrogen as the primary component, (2) a secondary key component that is more strongly sorbed by the adsorbent than hydrogen, and (3) a minor quantity of one or more dilute tertiary components less strongly sorbed than the secondary key component, are subject to selective adsorption in an adiabatic pressure swing adsorption (PSA) cycle for the separate recovery of high purity hydrogen and the secondary component. A given example is the treatment of the effluent gas from a shift converter in a hydrocarbon reformer plant, wherein hydrogn and carbon dioxide are separately recovered as key components substantially freed of minor dilute components such as methane, carbon monoxide and nitrogen.

14 Claims, 6 Drawing Sheets

| Time (min) | \multicolumn{6}{c}{Series A Beds} | | \multicolumn{3}{c}{B Beds} |
|---|---|---|---|---|---|---|---|---|---|---|

| Time (min) | 1A | 2A | 3A | 4A | 5A | 6A | | 1B | 2B | 3B |
|---|---|---|---|---|---|---|---|---|---|---|
| 0-1<br>1-2<br>2-3<br>3-4 | A | PE1<br>-<br>Pr-<br>Pr | -<br>PE3<br>- | Ev | DP | R | | A | P<br>PE2<br>Pr<br>Pr | PE1<br>PE2<br>PE3<br>DP |
| 4-5<br>5-6<br>6-7<br>7-8 | R | A | PE1<br>-<br>Pr<br>Pr | -<br>-<br>PE3<br>- | Ev | DP | | PE1<br>PE2<br>PE3<br>DP | A | P<br>PE2<br>Pr<br>Pr |
| 8-9<br>9-10<br>10-11<br>11-12 | DP | R | A | PE1<br>-<br>Pr<br>Pr | -<br>-<br>PE3<br>- | Ev | | P<br>PE2<br>Pr<br>Pr | PE1<br>PE2<br>PE3<br>DP | A |
| 12-13<br>13-14<br>14-15<br>15-16 | Ev | DP | R | A | PE1<br>-<br>Pr<br>Pr | -<br>-<br>PE3<br>- | | A | P<br>PE2<br>P<br>Pr | PE1<br>PE2<br>PE3<br>DP |
| 16-17<br>17-18<br>18-19<br>19-20 | -<br>-<br>PE3<br>- | Ev | DP | R | A | PE1<br>-<br>Pr<br>Pr | | PE1<br>PE2<br>PE3<br>DP | A | P<br>PE2<br>Pr<br>Pr |
| 20-21<br>21-22<br>22-23<br>23-24 | PE1<br>-<br>Pr<br>Pr | -<br>-<br>PE3<br>- | Ev | DP | R | A | | P<br>PE2<br>Pr<br>Pr | PE1<br>PE2<br>PE3<br>DP | A |

A — Adsorption Step
R — Rinse Step
DP — Depressurization Step
Ev — Evacuation Step
Pr — Pressurization Step
P — Purge Step
PE1 — First Pressure Equalization Step
PE2 — Second Pressure Equalization Step
PE3 — Third Pressure Equalization Step

FIGURE 3

(KEY: "O" indicates the valve is open, otherwise closed)

| VALVE # | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| TIME (MIN) | | | | | | | | | | | | | | | | | | |
| 0-1 | O | | | | | | | | | | | | | | | | | |
| 1-2 | O | | | | | | | | | | | | | | | | O | |
| 2-3 | O | | | | | | | | | | | | | | | | O | |
| 3-4 | | | | | | | | | | | | | | | | | O | |
| 4-5 | | O | | | | | | | | | | | | | | | O | O |
| 5-6 | | O | | | | | | | | | | | | | | | | O |
| 6-7 | | O | | | | | | | | | | | | | | | | O |
| 7-8 | | O | | | | | O | | | | | | | | | | | O |
| 8-9 | | | O | | | | O | | | | | | | | | | | |
| 9-10 | | | O | | | | O | O | | | | | | | | | | |
| 10-11 | | | O | | | | | O | O | | | | | | | | | |
| 11-12 | | | | O | | | | O | O | O | | | | | | | | |
| 12-13 | | | | O | | | | | O | O | O | O | | | | | | |
| 13-14 | | | | O | | | | | | O | O | O | O | | | | | |
| 14-15 | | | | O | | | | | | | O | O | O | O | | | | |
| 15-16 | | | | | O | | | | | | | | O | O | O | | | |
| 16-17 | | | | | O | | | | | | | | O | O | O | | | |
| 17-18 | | | | | O | | | | | | | | | O | O | | | |
| 18-19 | | | | | | O | | | | | | | | | O | | | |
| 19-20 | | | | | | O | | | | | | | | | O | | | |
| 20-21 | | | | | | O | | | | | | | | | | O | | |
| 21-22 | | | | | | O | | | | | | | | | | O | | |
| 22-23 | | | | | | | | | | | | | | | | O | | |
| 23-24 | | | | | | | | | | | | | | | | O | | |

FIGURE 3 (CONT.)

| VALVE # | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| TIME (MIN) | | | | | | | | | | | | | | | | | | |
| 0-1 | | | | | | | | | | | | | | | | | | |
| 1-2 | | | | | | | | | | | | | | | | | | o |
| 2-3 | | | | | | | | | | | | | | | | | | o |
| 3-4 | | o | | | | | | | | | | | | | | | | o |
| 4-5 | | | | | | | | | | o | | | | | | | | o |
| 5-6 | | | o | | | | | | | o | | | | | | | | |
| 6-7 | | | | | | | | | | o | | | | | | | | |
| 7-8 | | | | o | | | | | | o | o | | | | | | | |
| 8-9 | | | | | | | | | | | o | o | | | | | | |
| 9-10 | | | | | | | | | | | o | o | o | | | | | |
| 10-11 | | | | | o | | | | | | o | o | o | | | | | |
| 11-12 | | | | | | | | | | | | o | o | o | | | | |
| 12-13 | | | | | | o | | | | | | | o | o | o | | | |
| 13-14 | | | | | | | o | | | | | | | o | o | | | |
| 14-15 | | | | | | | o | | | | | | | | o | o | | |
| 15-16 | | | | | | | o | o | | | | | | | | o | | |
| 16-17 | | | | | | | o | o | | | | | | | | o | | |
| 17-18 | | | | | | | | o | | | | | | | | o | | |
| 18-19 | | | | | | | | o | | | | | | | | | | |
| 19-20 | o | | | | | | | | | | | | | | | | | |
| 20-21 | | | | | | | | | | | o | | | | | | | |
| 21-22 | | | | | | | | | o | | | | | | | | o | |
| 22-23 | | | | | | | | | o | | | | | | | | o | |
| 23-24 | | | | | | | | | o | | | | | | | | o | |

FIGURE 3 (CONT.)

| VALVE # | 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|---|
| TIME (MIN) | | | | | | | | | | | | | | | | | | |
| 0-1 | | | | | | | | | | | | | | | | | | |
| 1-2 | | | | | | | | | | | | | o o | | | | | |
| 2-3 | | | | | | | o o o | | | | | | | | | | | |
| 3-4 | | | | | | | o o o o | | | | | | | | | | | |
| 4-5 | | o o | | | | | | | | | | | | | | | | |
| 5-6 | | | | | | | | o o o o | | | | | | | | | |
| 6-7 | | | o o | | | | | | | | | | | | | | o o | |
| 7-8 | | | | | | | | | | | | | | | | | | o o |
| 8-9 | | | | | | | | | o o o o | | | | | | | | |
| 9-10 | | | | o o | | | | | | | | | | | | | | |
| 10-11 | | | | | | | | | | o o o o | | | | | | | |
| 11-12 | | | | | | | | | | | o o o o | | | | | | |
| 12-13 | | | | | | | | | | | | | | | | | | |
| 13-14 | | | | | | | | | | | | | o o o o | | | | |
| 14-15 | | | | | o o | | | | | | | | | | | | |
| 15-16 | | | | | | | | | | | | | | o o o o | | | |
| 16-17 | | | | | | | | | | | | | | | | | o o | |
| 17-18 | | | | | | | | | | | | | | | | | | o o |
| 18-19 | | | | | | o o | | | | | | | | | | | | |
| 19-20 | | | | | | | | | | | | o o o o | | | | | |
| 20-21 | | | | | | | | | | | | | | | o o o o | | | |
| 21-22 | | | | | | | | | | | | | | | | o o | | |
| 22-23 | o o | | | | | | | | | | | | | | | | | |
| 23-24 | | | | | | | | | | | | | | | | | | |

FIGURE 3 (CONT.)

| VALVE # TIME (MIN) | 55 | 56 | 57 | 58 | 59 | 60 | 61 | 62 | 63 | 64 | 65 | 66 | 67 | 68 | 69 |
|---|---|---|---|---|---|---|---|---|---|---|---|---|---|---|---|
| 0-1 | | | | | | | | | | | | | | | |
| 1-2 | | | | | | | | | | | | | | | |
| 2-3 | | o | | | | | | | | | | | | | |
| 3-4 | | | o | | | o | | | | | | | | | |
| 4-5 | | | o | | | o | | o | o | o | | | | o | |
| 5-6 | | | | o | | | | | | o | | | | o | o |
| 6-7 | | | | o | | | o | | o | o | o | | | | o |
| 7-8 | o | | | | | | | | | | o | o | | | |
| 8-9 | o | | | | | | | | | | o | o | o | | |
| 9-10 | | | | | | | | | | | | o | o | | |
| 10-11 | | | | | o | | | | | | | | | | |
| 11-12 | | o | | | o | | | | | | | | | | |
| 12-13 | | o | | | | o | | | | | | | | | |
| 13-14 | | | o | | | o | | o | o | o | | | | o | |
| 14-15 | | | o | o | | | o | | | o | | | | o | o |
| 15-16 | | | | o | | | o | o | o | o | o | | | | o |
| 16-17 | | | | | | | | | | | o | o | | | |
| 17-18 | | | | | | | | | | | o | o | o | | |
| 18-19 | | | | | | | | | | | | o | o | | |
| 19-20 | o | | | | | | o | | | | | | | | |
| 20-21 | o | | | | o | | o | | | | | | | | |
| 21-22 | | | | | o | | | | | | | | | | |
| 22-23 | | | | | | | | | | | | | | | |
| 23-24 | | o | | | | | | | | | | | | | |

SEPARATION OF MULTICOMPONENT GAS MIXTURES BY SELECTIVE ADSORPTION

TECHNICAL FIELD

The present invention relates generally to the separation and recovery of individual components of gas mixtures by pressure swing adsorption and is especially concerned with enhancing recovery of a primary component, such as hydrogen in particular, from such gas mixtures.

BACKGROUND OF THE INVENTION

Applicant's prior U.S. Pat. No. 4,171,206 describes a pressure swing adsorption (PSA) process (hereinafter the "base cycle") which can be used for the fractionation of a multicomponent gas mixture composed of (1) a bulk primary component, (2) a bulk secondary component more strongly sorbed than the primary component and (3) a minor quantity of one or more dilute components less strongly sorbed than the secondary component. By way of example, the '206 patent applied the base cycle to the production and recovery of pure hydrogen (primary component) and $CO_2$ (secondary component) from the gaseous effluent of a shift converter in a hydrocarbon reforming plant where the minor quantity of dilute components consisted of $CH_4$ and CO.

The present invention provides an improvement to the base cycle whereby the recovery of the primary component is significantly increased.

SUMMARY OF THE INVENTION

As indicated above the present invention provides an improvement to the base cycle disclosed in Applicant's prior U.S. Pat. No. 4,171,206 whereby the recovery of the primary component is significantly increased. (The sepcification of U.S. Pat. No. 4,171,206 is hereby incorporated by reference.) Specifically this improvement consists of redirecting the pressure equalization flow of the base cycle's second pressure equalization step (hereinafter "PE2 Redirection") while adding a third pressure equalization step (hereinafter "PE3"). As discussed infra, PE2 Redirection and PE3 complement each other and must be implemented together.

The operation of the invention will be understood and the advantages afforded thereby more fully appreciated from the detailed description which follows read in connection with the accompanying drawing illustrating a practical embodiment in which the invention may be practiced.

BRIEF DESCRIPTION OF THE DRAWINGS

FIG. I is a flow diagram of a preferred embodiment of the invention employing a group of six adsorbent vessels with connecting conduits designed for operation in parallel and in timed sequence, each of these vessels being connected to a second group of three adsorbent vessels through valved conduits designed to enable vessels of said first group to be placed in series flow communication with selected vessels of said second group.

FIG. II is a chart showing the process steps that each of the adsorbent vessels in FIG. I undergoes during an arbitrarily chosen 24 minute cycle.

FIG. III is a chart showing the valve sequence for FIG. I's valves during FIG. II's arbitrarily chosen 24 minute cycle. Together, FIGS. I, II and III represent an integration of the invention into the base cycle.

DETAILED DESCRIPTION

Figure 1:
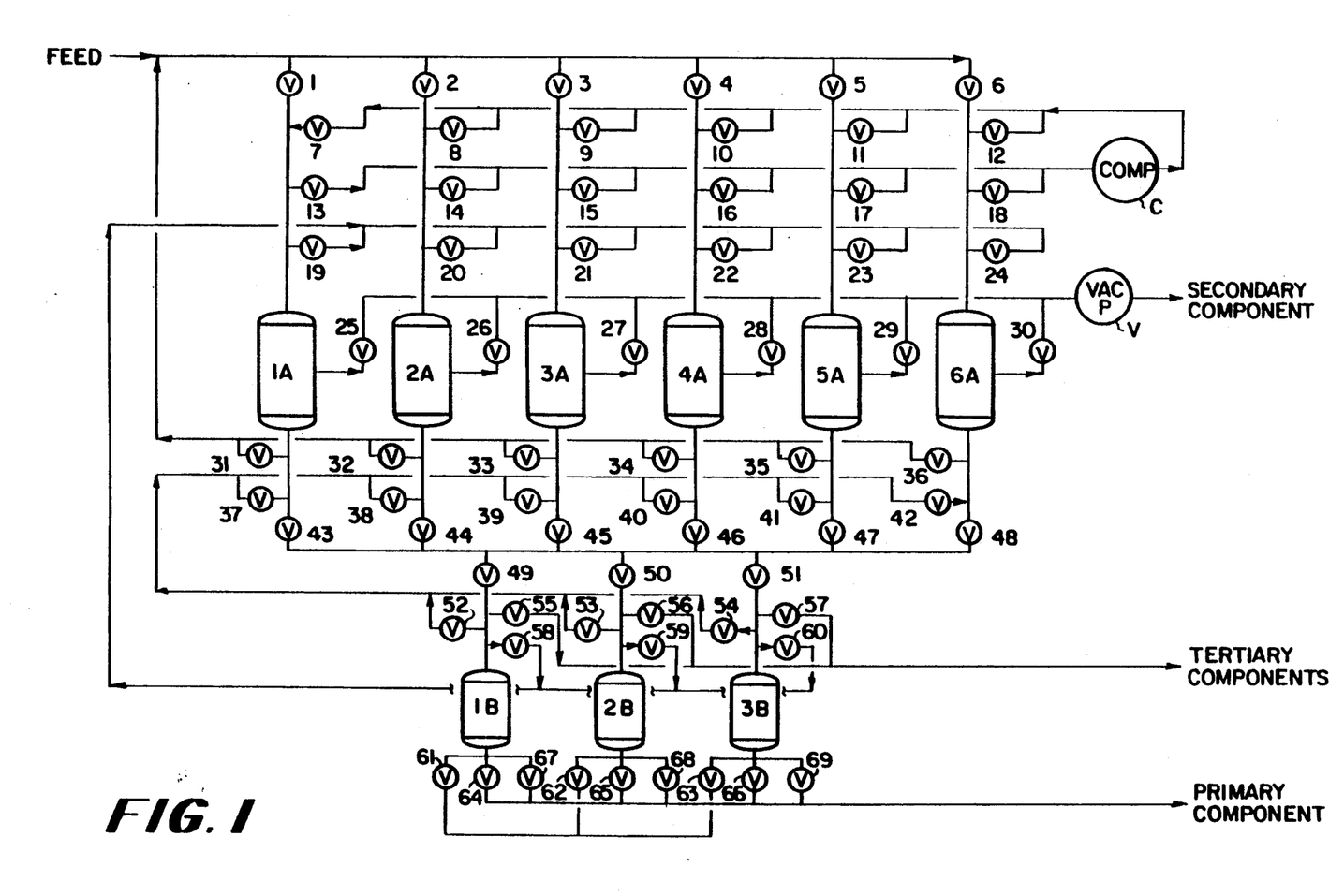
Figure 2:
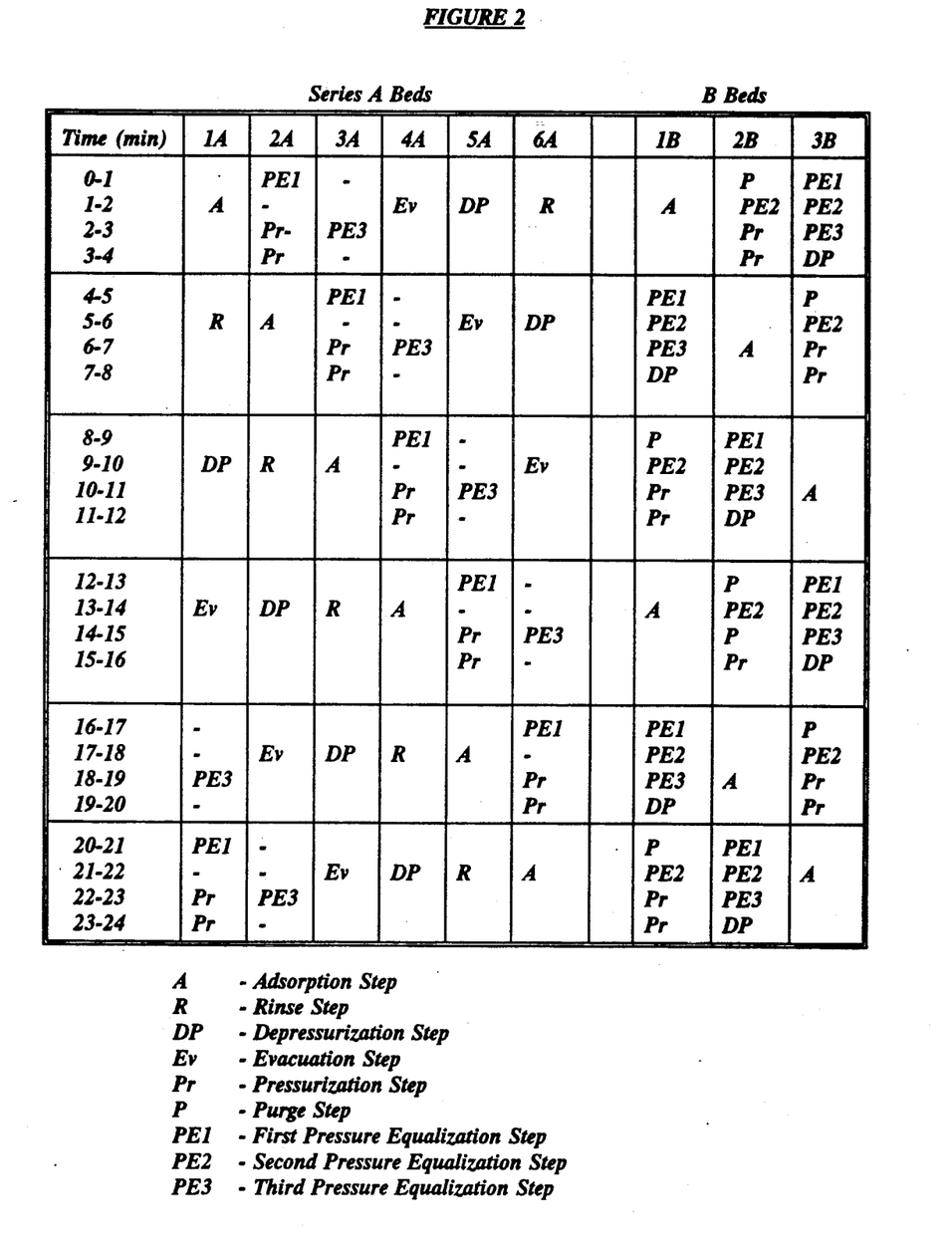
Figure 3:
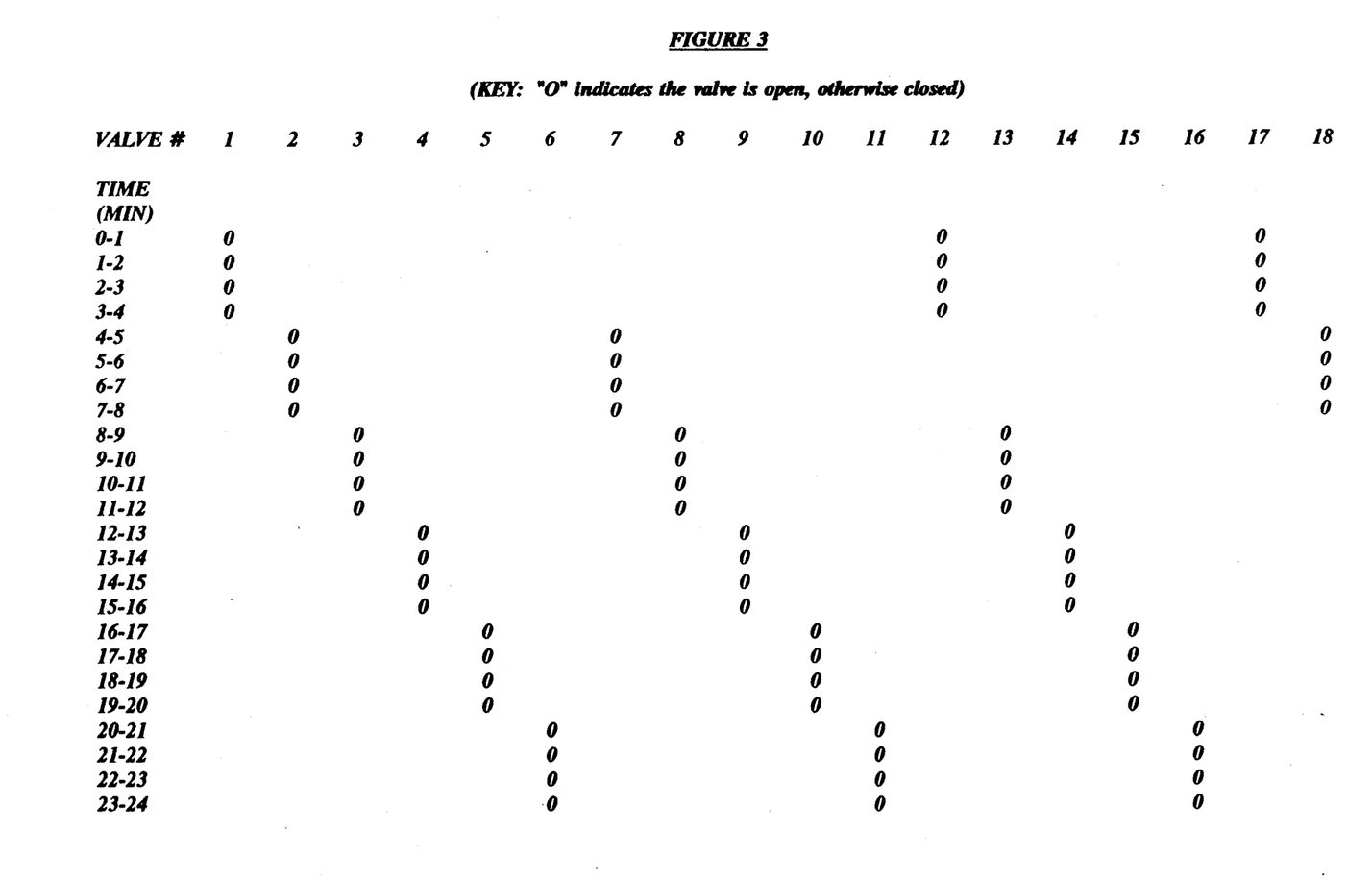

As shown in FIG. I, the present invention employs two sets of adsorbent beds with the most strongly adsorbed secondary component recovered in the first set of beds (A beds) while the minor quantity of dilute components (also referred to as "impurities" or "tertiary components") are removed in the second set of beds (B beds). In addition to these adsorption columns, the illustrated PSA system further comprises a compressor identified by "C", a vacuum pump identified by "V", and switching valves identified by number designation. Each set of adsorption vessels undergoes a certain sequence of cyclic steps as described below. These steps are similar to those disclosed in the base cycle except for steps (B)(3)(b) and (B)(7)(a) which incorporate PE2 Redirection and steps (A)(5) and (B)(4) which incorporate PE3.

A) Cycle Steps for A Columns

1) Adsorption Step, which consists of:
   (a) Flowing the multicomponent gas mixture at a pressure of approximately 30–500 psia and a temperature of approximately 40°–150° F. through the A column packed with an adsorbent capable of selectively adsorbing the desired secondary component from the gas mixture.
   (b) Withdrawing an effluent stream which now is essentially free of the secondary component and feeding the effluent stream to a B column which is on step (B)(1).
   (c) Continuing steps (1)(a) and (1)(b) above for a predetermined cycle time or until the concentration of the secondary component in the effluent stream reaches a preset limit. The A column is now called "spent" because it has exhausted its capacity for adsorbing the secondary component from the gas mixture.
2) Rinse Step, which consists of:
   (a) Raising the pressure of the high purity secondary component desorbed in Step (A)(3)(b) to the adsorption pressure by a compressor.
   (b) Passing this gas through the "spent" A column cocurrently to the feed flow to displace any void gas or adsorbed impurities.
   (c) Mixing the effluent gas from step (A)(2)(b) with fresh feed gas in step (A)(1)(a).
3) Depressurization Step, which consists of:
   (a) Discontinuing the rinse flow through the A column and transferring the feed to another A column.
   (b) Reducing the pressure in the "rinsed" A column to approximately 15 psia by venting the gas in a direction opposite to the feed flow.
4) Evacuation Step, which consists of:
   (a) Further lowering the pressure of the depressurized A column from a pressure of approximately 15 psia to a pressure of approximately 40–200 torr by evacuating the gas from the feed end of the A column.
   (b) Storing the evacuated gas, which is essentially the secondary component, at ambient pressure for further use.
5) Pressure Equalization Step III (PE3), which consists of:

(a) Discontinuing the pressure reduction of the A column. The A column is now called "regenerated" because its capacity for removing the secondary component has been restored.

(b) Raising the pressure in the regenerated A column from evacuation level by connecting the feed end of the regenerated A column with the feed end of a B column which is on step (B)(4).

(c) Discontinuing the above step when the pressures in the connected A and B columns are about equal.

(d) Note: As noted supra, step (A)(5) is an improvement to the base cycle. In the base cycle this step does not exist.

6) Pressure Equalization Step I (PE1), which consists of:

(a) Disconnecting the A column from the B column at the end of the above step.

(b) Further raising the pressure in the A column by connecting the feed end of the A column with the feed end of a B column, which is on step (B)(2).

(c) Discontinuing the above step when the pressures in the connected A and B columns are about equal.

7) Repressurization Step, which consists of:

(a) Connecting the product end of the A column with the feed end of a B column which has just finished step (B)(7) and is on step (B)(8).

(b) Raising the pressure in the A column to the adsorption pressure level (approximately 30-500 psia) via the effluent gas from a B column on step (B)(8).

(c) Discontinuing the above step when the pressure in the regenerated A column has reached the desired level.

The A column is now ready to undergo a new cycle starting at step (A)(1).

B) Cycle Steps for B Columns

1) Adsorption Step, which consists of:

(a) Flowing the effluent from an A column on step (A)(1), which effluent has been depleted on the secondary component, at a pressure of approximately 30-500 psia and a temperature of approximately 40°-150° F. through the B column packed with adsorbents capable of selectively adsorbing all the components of the mixture except the desired primary product.

(b) Withdrawing an effluent stream, which is the very high purity primary component.

(c) Continuing steps (1)(a) and (1)(b) above for a predetermined cycle time or until the concentration of impurities in the effluent stream reaches a preset limit. This column is now called "spent" because it has exhausted its capacity for removing the impurities from the primary component.

2) Pressure Equalization Step I (PE1), which consists of:

(a) Discontinuing the feed flow through the "spent" A and B columns and transferring the feed to another pair of A and B columns which are in direct communication.

(b) Reducing the pressure in the B column by connecting the feed end of this B column with the feed end of an A column on step (A)(6).

(c) Discontinuing the above steps when the pressures in the connected A and B columns are about equal.

3) Pressure Equalization Step II (PE2), which consists of:

(a) Disconnecting the A and B columns at the end of the above step.

(b) Further reducing the pressure in the B column by connecting the effluent end of the B column with the effluent end of another B column on step (B)(7). Note: As noted supra, this step (B)(3)(b) is an improvement to the base cycle specifically with respect to how the connection is made. In the base cycle, the connection was made between the feed ends (as opposed to the effluent ends) of the B columns.

(c) Discontinuing the above step when the pressures in the connected B columns are about equal.

4) Pressure Equalization Step III (PE3) which consists of:

(a) Disconnecting the B column from the other B column at the end of the above step.

(b) Further reducing the pressure in the B column by connecting the feed end of the B column with the feed end of an A column on step (A)(5).

(c) Discontinuing the above step when the pressures in the connected A and B columns are about equal.

(d) Note: As noted supra, step (b)(4) is an improvement to the base cycle. In the base cycle, this step did not exist.

5) Depressurization Step, which consists of:

(a) Disconnecting the A and B columns at the end of the above step.

(b) Further reducing the pressure in the B column to approximately 15-30 psia by venting the gas in direction opposite to the feed flow. The desorbed gas may be vented as waste, used as fuel, or used as feed to another process.

(c) Discontinuing the above step when the pressure in the B column has reached approximately 15-30 psia.

6) Purge Step, which consists of:

(a) Flowing the very high purity primary component in a direction opposite to the feed flow through the B column at a pressure of approximately 15-30 psia.

(b) Continuing this purge gas flow for a predetermined time such that the B column is sufficiently clean of the impurities. The column is now called "regenerated" since its capacity for removing the impurities from the primary component has been restored.

(c) Discontinuing the purge gas flow by transferring it to another B column which has just finished step (B)(5). The purge gas effluent may be vented as waste, used as fuel, or used as feed to another process.

7) Pressure Equalization Step II (PE2), which consists of:

(a) Raising the pressure in the B column from a pressure of approximately 15-30 psia by connecting the effluent end of this B column with the effluent end of another B column on step (B)(3). Note: As noted supra, this step (B)(7)(a) is an improvement to the base cycle, specifically with respect to how the connection is made. In the base cycle, this connection was between the feed ends (as opposed to the effluent ends) of the B columns.

(b) Discontinuing the above step when the pressures in the connected B columns are about equal.

8) Repressurization Step, which consists of:

(a) Raising the pressure in the B column to adsorption pressure level (approximately 30-500 psia) by flowing the very high purity primary component through the B column.

(b) Effluent from the feed end of this column is used to repressurize the A column on step (A)(7).

(c) Discontinuing the above step when the pressure in the regenerated B column has reached the desired level.

The B column is now ready to undergo a new cycle starting at step (B)(1).

In the following six paragraphs, the operation of one embodiment of the invention will be explained based on the flow diagram of FIG. I, the process cycle of FIG. II and the valve sequence of FIG. III. Together, FIGS. I, II and III represent an integration of the invention into the base cycle.

Feed at a pressure of approximately 300 psia and a temperature of approximately 40–°100° F. is fed to the first integrated train, columns 1A and 1B, via open valves 1, 43, and 49. These columns have previously been pressurized to the adsorption pressure of approximately 300 psia. The primary component is withdrawn from column 1B via open valve 64 at a pressure of approximately 300 psia. The adsorption step is continued for a fixed time or until the effluent concentrations from both columns have reached a predetermined level. At the end of this train's adsorption step, the feed is directed to the second integrated train, columns 2A and 2B. (Discussion of the second train resumes in the subsequent paragraph). Column 1A is now rinsed with the high purity secondary component through open valve 7. The effluent which is feed like in composition passes through open valve 31 to be mixed with the feed. Column 1A is then depressurized to atmospheric pressure through open valve 13. This gas is compressed to a pressure of approximately 300 psia, used as a rinse gas for Column 2A, and then recycled to the feed stream where it is mixed with fresh feed. During this time column 1B has undergone four pressure reduction steps. In the first, the pressure in column 1B is reduced by connecting the feed end of column 1B with the feed end of column 3A via open valves 58 and 21. Column 3A has just completed a previous pressure equalization with column 3B. When the pressures in the columns are about equal, the second pressure reduction begins by connecting the effluent end of column 1B to the effluent end of column 3B through open valves 61 and 63. Column 3B has just finished purging and is at a pressure of approximately 20 psia. Again, when the pressures are approximately equal, the third pressure reduction begins by connecting the feed end of column 1B to the feed end of column 4A through valves 58 and 22. Column 4A has just completed the evacuation step and is at a pressure of approximately 100 mmHg. After this third pressure equalization, the fourth pressure reduction begins by venting column 1B to approximately 20 psia through open valve 55. The gas from this step is either vented, used as fuel, or as feed gas to another process. Following column 1A's depressurization, column 1A undergoes further pressure reduction by evacuation via valve 25. The pressure in column 1A is reduced to approximately 100 mmHg and the evacuated gas is the most strongly adsorbed component of the feed mixture which is the secondary component. The feed end of column 1A is now connected to the feed end of column 1B via open valves 19 and 58. Column 1B has just finished two consecutive pressure equalization steps with columns 6A and 3B respectively. After equalization, the feed end of column 1A is connected with the feed end of column 2B through open valves 19 and 59. During the evacuation and pressure equalization steps for column 1A, column 1B is purged with the primary component countercurrently to the feed flow. The primary product gas enters column 1B via open valve 67 and exits via open valve 55 at a pressure of approximately 20 psia. The purge effluent is either vented, used as fuel, or as a feed to another process. Following the purge step, the effluent end of column 1B is connected to the effluent end of column 2B which has just finished a pressure equalization with column 1A. The two columns are equalized in this step. Column 1A and 1B are now repressurized via open valves 67, 52, and 37. The primary component is used for this repressurization step. Columns 1A and 1B are now ready to undergo another cycle.

Following the first train's adsorption step, the feed is directed to the second integrated train, columns 2A and 2B, via open valves 2, 44, and 50. These columns have previously been pressurized to the adsorption pressure of approximately 300 psia. The primary component is withdrawn from column 2B via open valve 65 at a pressure of approximately 300 psia. The adsorption step is continued for a fixed time or until the effluent concentrations from both columns have reached a predetermined level. At the end of this train's adsorption step, the feed is directed to the third integrated train, columns 3A and 3B. (Discussion of the third train resumes in the subsequent paragraph). Column 2A is now rinsed with the high purity secondary component through open valve 8. The effluent which is feed like in composition passes through open valve 32 to be mixed with the feed. Column 2A is then depressurized to atmospheric pressure through open valve 14. This gas is compressed to a pressure of approximately 300 psia, used as a rinse gas for Column 3A, and then recycled to the feed stream where it is mixed with fresh feed. During this time column 2B has undergone four pressure reduction steps. In the first, the pressure in column 2B is reduced by connecting the feed end of column 2B with the feed end of column 4A via open valves 59 and 22. Column 4A has just completed a previous pressure equalization with column 1B. When the pressures in the columns are about equal, the second pressure reduction begins by connecting the effluent end of column 2B to the effluent end of column 1B through open valves 62 and 61. Column 1B has just finished purging and is at a pressure of approximately 20 psia. Again, when the pressures are approximately equal, the third pressure reduction begins by connecting the feed end of column 2B to the feed end of column 5A through valves 59 and 23. Column 5A has just completed the evacuation step and is at a pressure of approximately 100 mmHg. After this third pressure equalization, the fourth pressure reduction begins by venting column 2B to approximately 20 psia through open valve 56. The gas from this step is either vented, used as fuel, or as feed gas to another process. Following column 2A's depressurization, column 2A undergoes further pressure reduction by evacuation via valve 26. The pressure in column 2A is reduced to approximately 100 mmHg and the evacuated gas is the most strongly adsorbed component of the feed mixture which is the secondary component. The feed end of column 2A is now connected to the feed end of column 2B via open valves 20 and 59. Column 2B has just finished two consecutive pressure equalization steps with columns 1A and 1B respectively. After equalization, the feed end of column 2A is connected with the feed end of column 3B through open valves 20 and 60. During the evacuation and pressure equalization steps for column 2A, column 2B is purged with the primary component countercurrently to the feed flow. The primary product gas enters column 2B via open valve 68 and exits via open valve 56 at a pressure of approximately 20 psia. The purge effluent is either vented, used as fuel, or as a feed to another process. Following the purge step, the effluent end of column 2B is connected to the effluent end of column 3B which has just finished a pressure equalization with column 2A. The two columns are equalized in this step. Column 2A and 2B are now repressurized via open valves 68, 53, and 38. The primary component is used for this repressurization step. Columns 2A and 2B are now ready to undergo another cycle.

Following the second train's adsorption step, the feed is directed to the third integrated train, columns 3A and 3B, via open valves 3, 45, and 51. These columns have previously been pressurized to the adsorption pressure of approximately 300 psia. The primary component is withdrawn from column 3B via open valve 66 at a pressure of approximately 300 psia. The adsorption step is continued for a fixed time or until the effluent concentrations from both columns have reached a predetermined level. At the end of this train's adsorption step, the feed is directed to the fourth integrated train, columns 4A and 1B. (Discussion of the fourth train resumes in the subsequent paragraph). Column 3A is now rinsed with the high purity secondary component through open valve 9. The effluent which is feed like in composition passes through open valve 33 to be mixed with the feed. Column 3A is then depressurized to atmospheric pressure through open valve 15. This gas is compressed to a pressure of approximately 300 psia, used as a rinse gas for Column 4A, and then recycled to the feed stream where it is mixed with fresh feed. During this time column 3B has undergone four pressure reduction steps. In the first, the pressure in column 3B is reduced by connecting the feed end of column 3B with the feed end of column 5A via open valves 60 and 23. Column 5A has just completed a previous pressure equalization with column 2B. When the pressures in the columns are about equal, the second pressure reduction begins by connecting the effluent end of column 3B to the effluent end of column 2B through open valves 63 and 62. Column 2B has just finished purging and is at a pressure of approximately 20 psia. Again, when the pressures are approximately equal, the third pressure reduction begins by connecting the feed end of column 3B to the feed end of column 6A through valves 60 and 24. Column 6A has just completed the evacuation step and is at a pressure of approximately 100 mmHg. After this third pressure equalization, the fourth pressure reduction begins by venting column 3B to approximately 20 psia through open valve 57. The gas from this step is either vented, used as fuel, or as feed gas to another process. Following column 3A's depressurization, column 3A undergoes further pressure reduction by evacuation via valve 27. The pressure in column 3A is reduced to approximately 100 mmHg and the evacuated gas is the most strongly adsorbed component of the feed mixture which is the secondary component. The feed end of column 3A is now connected to the feed end of column 3B via open valves 21 and 60. Column 3B has just finished two consecutive pressure equalization steps with columns 2A and 2B respectively. After equalization, the feed end of column 3A is connected with the feed end of column 1B through open valves 21 and 58. During the evacuation and pressure equalization steps for column 3A, column 3B is purged with the primary component countercurrently to the feed flow. The primary product gas enters column 3B via open valve 69 and exits via open valve 57 at a pressure of approximately 20 psia. The purge effluent is either vented, used as fuel, or as a feed to another process. Following the purge step, the effluent end of column 3B is connected to the effluent end of column 1B which has just finished a pressure equalization with column 3A. The two columns are equalized in this step. Column 3A and 3B are now repressurized via open valves 69, 54, and 39. The primary component is used for this repressurization step. Columns 3A and 3B are now ready to undergo another cycle.

Following the third train's adsorption step, the feed is directed to the fourth integrated train, columns 4A and 1B, via open valves 4, 46, and 49. These columns have previously been pressurized to the adsorption pressure of approximately 300 psia. The primary component is withdrawn from column 1B via open valve 64 at a pressure of approximately 300 psia. The adsorption step is continued for a fixed time or until the effluent concentrations from both columns have reached a predetermined level. At the end of this train's adsorption step, the feed is directed to the fifth integrated train, columns 5A and 2B. (Discussion of the fifth train resumes in the subsequent paragraph). Column 4A is now rinsed with the high purity secondary component through open valve 10. The effluent which is feed like in composition passes through open valve 34 to be mixed with the feed. Column 4A is then depressurized to atmospheric pressure through open valve 16. This gas is compressed to a pressure of approximately 300 psia, used as a rinse gas for Column 5A, and then recycled to the feed stream where it is mixed with fresh feed. During this time column 1B has undergone four pressure reduction steps. In the first, the pressure in column 1B is reduced by connecting the feed end of column 1B with the feed end of column 6A via open valves 58 and 24. Column 6A has just completed a previous pressure equalization with column 3B. When the pressures in the columns are about equal, the second pressure reduction begins by connecting the effluent end of column 1B to the effluent end of column 3B through open valves 61 and 63. Column 3B has just finished purging and is at a pressure of approximately 20 psia. Again, when the pressures are approximately equal, the third pressure reduction begins by connecting the feed end of column 1B to the feed end of column 1A through valves 58 and 19. Column 1A has just completed the evacuation step and is at a pressure of approximately 100 mmHg. After this third pressure equalization, the fourth pressure reduction begins by venting column 1B to approximately 20 psia through open valve 55. The gas from this step is either vented, used as fuel, or as feed gas to another process. Following column 4A's depressurization, column 4A undergoes further pressure reduction by evacuation via valve 28. The pressure in column 4A is reduced to approximately 100 mmHg and the evacuated gas is the most strongly adsorbed component of the feed mixture which is the secondary component. The feed end of column 4A is now connected to the feed end of column 1B via open valves 22 and 58. Column 1B has just finished two consecutive pressure equalization steps with columns 3A and 3B respectively. After equalization, the feed end of column 4A is connected with the feed end of column 2B through open valves 22 and 59. During the evacuation and pressure equalization steps for column 4A, column 1B is purged with the primary component countercurrently to the feed flow. The primary product gas enters column 1B via open valve 67 and exits via open valve 55 at a pressure of approximately 20 psia. The purge effluent is either vented, used as fuel, or as a feed to another process. Following the purge step, the effluent end of column 1B is connected to the effluent end of column 2B which has just finished a pressure equalization with column 4A. The two columns are equalized in this step. Column 4A and 1B are now repressurized via open valves 67, 52, and 40. The primary component is used for this repressurization step. Columns 4A and 1B are now ready to undergo another cycle.

Following the fourth train's adsorption step, the feed is directed to the fifth integrated train, columns 5A and 2B, via open valves 5, 47, and 50. These columns have previously been pressurized to the adsorption pressure of approximately 300 psia. The primary component is withdrawn from column 2B via open valve 65 at a pressure of approximately 300 psia. The adsorption step is continued for a fixed time or until the effluent concentrations from both columns have reached a predetermined level. At the end of this train's adsorption step, the feed is directed to the sixth integrated train, columns 6A and 3B. (Discussion of the sixth train resumes in the subsequent paragraph). Column 5A is now rinsed with the high purity secondary component through open valve 11. The effluent which is feed like in composition passes through open valve 35 to be mixed with the feed. Column 5A is then depressurized to atmospheric pressure through open valve 17. This gas is compressed to a pressure of approximately 300 psia, used as a rinse gas for Column 6A, and then recycled to the feed stream where it is mixed with fresh feed. During this time column 2B has undergone four pressure reduction steps. In the first, the pressure in column 2B is reduced by connecting the feed end of column 2B with the feed end of column 1A via open valves 59 and 19. Column 1A has just completed a previous pressure equalization with column 1B. When the pressures in the columns are about equal, the second pressure reduction begins by connecting the effluent end of column 2B to the effluent end of column 2B through open valves 62 and 61. Column 1B has just finished purging and is at a pressure of approximately 20 psia. Again, when the pressures are approximately equal, the third pressure reduction begins by connecting the feed end of column 2B to the feed end of column 2A through valves 59 and 20. Column 2A has just completed the evacuation step and is at a pressure of approximately 100 mmHg. After this third pressure equalization, the fourth pressure reduction begins by venting column 2B to approximately 20 psia through open valve 56. The gas from this step is either vented, used as fuel, or as feed gas to another process. Following column 5A's depressurization, column 5A undergoes further pressure reduction by evacuation via valve 29. The pressure in column 5A is reduced to approximately 100 mmHg and the evacuated gas is the most strongly adsorbed component of the feed mixture which is the secondary component. The feed end of column 5A is now connected to the feed end of column 2B via open valves 23 and 59. Column 2B has just finished two consecutive pressure equalization steps with columns 4A and 1B respectively. After equalization, the feed end of column 5A is connected with the feed end of column 3B through open valves 23 and 60. During the evacuation and pressure equalization steps for column 5A, column 2B is purged with the primary component countercurrently to the feed flow. The primary product gas enters column 2B via open valve 68 and exits via open valve 56 at a pressure of approximately 20 psia. The purge effluent is either vented, used as fuel, or as a feed to another process. Following the purge step, the effluent end of column 2B is connected to the effluent end of column 3B which has just finished a pressure equalization with column 5A. The two columns are equalized in this step. Column 5A and 2B are now repressurized via open valves 68, 53, and 41. The primary component is used for this repressurization step. Columns 5A and 2B are now ready to undergo another cycle.

Following the fifth train's adsorption step, the feed is directed to the sixth integrated train, columns 6A and 3B, via open valves 6, 48, and 51. These columns have previously been pressurized to the adsorption pressure of approximately 300 psia. The primary component is withdrawn from column 3B via open valve 66 at a pressure of approximately 300 psia. The adsorption step is continued for a fixed time or until the effluent concentrations from both columns have reached a predetermined level. At the end of this train's adsorption step, the feed is directed back to the first integrated train, columns 1A and 1B. Column 6A is now rinsed with the high purity secondary component through open valve 12. The effluent which is feed like in composition passes through open valve 36 to be mixed with the feed. Column 6A is then depressurized to atmospheric pressure through open valve 18. This gas is compressed to a pressure of approximately 300 psia, used as a rinse gas for Column 1A, and then recycled to the feed stream where it is mixed with fresh feed. During this time column 3B has undergone four pressure reduction steps. In the first, the pressure in column 3B is reduced by connecting the feed end of column 3B with the feed end of column 2A via open valves 60 and 20. Column 2A has just completed a previous pressure equalization with column 2B. When the pressures in the columns are about equal, the second pressure reduction begins by connecting the effluent end of column 3B to the effluent end of column 2B through open valves 63 and 62. Column 2B has just finished purging and is at a pressure of approximately 20 psia. Again, when the pressures are approximately equal, the third pressure reduction begins by connecting the feed end of column 3B to the feed end of column 3A through valves 60 and 21. Column 3A has just completed the evacuation step and is at a pressure of approximately 100 mmHg. After this third pressure equalization, the fourth pressure reduction begins by venting column 3B to approximately 20 psia through open valve 57. The gas from this step is either vented, used as fuel, or as feed gas to another process. Following column 6A's depressurization, column 6A undergoes further pressure reduction by evacuation via valve 30. The pressure in column 6A is reduced to approximately 100 mmHg and the evacuated gas is the most strongly adsorbed component of the feed mixture which is the secondary component. The feed end of column 6A is now connected to the feed end of column 3B via open valves 24 and 60. Column 3B has just finished two consecutive pressure equalization steps with columns 5A and 2B respectively. After equalization, the feed end of column 6A is connected with the feed end of column 1B through open valves 24 and 58. During the evacuation and pressure equalization steps for column 6A, column 3B is purged with the primary component countercurrently to the feed flow. The primary product gas enters column 3B via open valve 69 and exits via open valve 57 at a pressure of approximately 20 psia. The purge effluent is either vented, used as fuel, or as a feed to another process. Following the purge step, the effluent end of column 3B is connected to the effluent end of column 1B which has just finished a pressure equalization with column 6A. The two columns are equalized in this step. Column 6A and 3B are now repressurized via open valves 69, 54, and 42. The primary component is used for this repressurization step. Columns 6A and 6B are now ready to undergo another cycle.

As noted previously, there are two aspects of this invention that act in concert to improve the recovery of the primary component relative to the base cycle: redirecting the pressure equalization flow of the base cycle's second pressure equalization step (PE2 Redirection) and adding a third pressure equalization step (PE3). As will be shown in the Example, infra, PE2 Redirection and PE3 improved the base cycle's recovery of the primary component by two percentage points.

The PE2 Redirection changes the connection between the B columns during the second pressure equalization step. In the base cycle, this connection is from the feed end of the "transferring" B column (i.e. the column which is initially at the higher pressure prior to PE2's pressure equalization) to the feed end at the "receiving" B column (i.e. the B column which is initially at the lower pressure prior to PE2's pressure equalization). PE2 Redirection changes this connection to be from the effluent end of the transferring B column to the effluent end of the receiving B column. The result is less impurity transfer to the receiving B column during PE2 since the impurities are concentrated at the feed end of the transferring B column prior to PE2. This in turn increases the adsorption capacity of the receiving B column's next adsorption step thereby improving the cycle's efficiency and primary component recovery. Although PE2 redirection does tend to stretch the transferring B column's mass transfer zone thereby requiring more primary component to eventually purge this B column (thereby reducing the cycle's efficiency), this negative effect of PE2 Redirection is compensated for by the immediately following PE3 step. PE3, by subsequently transferring from the feed end of this B column, recompacts the mass transfer zone. This is why PE2 redirection and PE3 complement each other and must be implemented together. In addition to recompacting the mass transfer zone, PE3 also lowers the pressure of the transferring B column prior to said column's subsequent depressurization step. The result is that less primary component is vented as waste which further improves recovery of the primary component.

EXAMPLE

A laboratory test trial for the improved cycle was made to confirm its performance. The feed gas was 75% hydrogen, 18.1% $CO_2$, 0.5% CO, 6.2% $CH_4$, and 0.2% $N_2$. The feed pressure was 300 psia and the temperature was 70° F. The A columns were 12.8 feet long and 2 inches in diameter and were packed with NaX zeolite for selective adsorption of $CO_2$ from the multicomponent gas mixture. The B columns were 12.8 feet and 2 inches in diameter and were packed with 2.8 feet of NaX zeolite at the feed end and 10 feet of BaX zeolite at the product end. NaX zeolite in the B columns removed $CO_2$ which broke through the A beds during the adsorption step and BaX zeolite in the B beds removed the CO, $CH_4$, and $N_2$ from the hydrogen. The hydrogen recovery was 88.1% with a purity of 99.9987.

A comparison of experimental results for the base cycle in U.S. Pat. No. 4,171,206 and the improved cycle in this invention is given in the following table. The feed represents a typical case for feed gas from a steam methane reformer. As can be seen, the improved cycle increased the hydrogen recovery by two percentage points over the base cycle.

| Feed Comp. | Base Cycle | Improved Cycle |
|---|---|---|
| $H_2$ | 74.8 | 75.0 |
| $CO_2$ | 18.3 | 18.1 |
| CO | 0.5 | 0.5 |
| $CH_4$ | 6.2 | 6.2 |
| $N_2$ | 0.2 | 0.2 |
| $H_2$ Recovery | 86.0 | 88.1 |
| $H_2$ Purity | 99.9988 | 99.9987 |

While the invention has been particularly described in connection with the separation and recovery of hydrogen as the primary key component and $CO_2$ as the secondary key component from a gas mixture containing these components accompanied by a minor quantity at dilute components, it will be understood that the described system and operation can be advantageously employed in the separation of other multicomponent gas mixtures having present therein a major portion of (1) primary key component which is not substantially adsorbed in either of the adsorbent columns of a train, (2) a secondary key components desired to be recovered and which is preferentially adsorbed and (3) one of more dilute components which are less strongly adsorbed than the secondary key component. Any sorbent which is selective towards the secondary key component of the feed mixture can be used in the A columns. The sorbent in the B columns should be selective for the minor tertiary components of the feed mixture or there may be employed in the B columns a combination of sorbents for that purpose.

Having thus described the invention, what is desired to be secured by letters patent of the United States is set forth in the following claims.

What is claimed is:

1. In a separation of a multicomponent feed gas mixture with the individual recovery of a primary key component and a secondary key component present in said mixture, by selective sorption, wherein said secondary key component is more strongly sorbed than said primary key component and there is present in said mixture at least one minor dilute tertiary gas component less strongly sorbed than said secondary key component and wherein the separation of said multicomponent feed gas mixture is effected in a defined system comprising a plurality of first sorbent beds (A) each having a feed end and an effluent end and which operate sequentially in parallel during a fixed cycle and a plurality of second sorbent beds (B), each having a feed end and an effluent end and which also operate sequentially in parallel during the fixed cycle, at least one of which second beds (B) is selectively coupled in series with one or another first bed (A) during the passage of the feed gas mixture into said first bed (A); the method which comprises, in an adiabatic adsorption pressure swing cycle, the steps of:

(a) passing said multicomponent feed gas mixture at initial superatmospheric pressure and in selected flow direction through a first sorbent bed (A) selective for preferential retention of said secondary key component and then passing the effluent from said first bed through a second sorbent bed (B) selective for retention of said tertiary component(s), and discharging from said second bed unadsorbed primary key component, said passing of the multicomponent gas mixture being continued for a controlled time period until or short of breakthrough of said secondary key component from said first bed, while retaining all of the said tertiary components in said second bed;

(b) thereafter discontinuing gas flow communication between said first and second beds, and
  (i) rinsing said first bed by flowing a stream of secondary key component therethrough at a pressure substantially equal to the initial superatmospheric pressure of the feed gas mixture for a controlled time period effective to purge the majority of any void and desorbed gases from said first bed, and during said rinsing of said first bed,
  (ii) lowering the pressure in said second bed to an intermediate level by withdrawing a gas stream therefrom including void and desorbed gases, wherein said pressure lowering is effected in three sequential pressure equalization transfers,
    (a) during the first of which pressure equalization transfers withdrawn gas from the feed end of said second bed is transferred to the feed end of a first bed undergoing step (e) (ii) below thereby equalizing the pressures between the two beds involved in said first pressure equalization transfer, and
    (b) during the second pressure equalization transfer withdrawn gas from the effluent end of said second bed is transferred to the effluent end of a second bed undergoing step (c) (ii) below thereby equalizing the pressures between the two beds involved in said second pressure equalization transfer, and
    (c) during the third pressure equalization transfer withdrawn gas from the feed end of said second bed is transferred to the feed end of a first bed undergoing step (e) (i) below thereby equalizing the pressures between the two beds involved in said third pressure equalization transfer; and thereafter
  (iii) further depressing said second bed to near ambient pressure;

(c) after said rinsing step in (b) above reducing the pressure in said first bed to substantially ambient level by desorption of gas therefrom including previously sorbed secondary key component and during this step (c),
  (i) purging said second bed at near ambient pressure with a stream of primary key component, and
  (ii) partially repressurizing said second bed to an intermediate pressure level by a pressure equalization transfer into the effluent end of said second bed of withdrawn gas from the effluent end of a second bed undergoing step (b) (ii) (b) above thereby equalizing the pressures between the two beds involved in said pressure equalization transfer;

(d) following step (c) above evacuating said first bed to subatmospheric level;

(e) after attaining the subatmospheric level in said first bed, repressurizing said first bed to an intermediate pressure level by flow thereinto of gas substantially free of the secondary key component wherein said repressurization to an intermediate pressure level is effected in two sequential pressure equalization transfers,
  (i) during the initial of which pressure equalization transfers withdrawn gas from the feed end of a second bed undergoing step (b) (ii) (c) above is transferred into the feed end of said first bed thereby equalizing the pressure between the two beds involved in said initial pressure equalization transfer, and
  (ii) during the subsequent pressure equalization transfer withdrawn gas from the feed end of a second bed undergoing step (b) (ii) (a) above is transferred into the feed end of said first bed thereby equalizing the pressures between the two beds involved in said subsequent pressure equalization transfer; and thereafter (f) further repressurizing said first bed to the initial superatmospheric feed pressure level by flowing thereinto primary key component via second bed already pressurized to the intermediate pressure level per step (c) (ii) above, thereby bringing both beds to the feed pressure level and making them ready to repeat the defined sequence of steps beginning with the reintroduction of the multicomponent feed gas mixture into said first sorbent bed.

2. The method as defined in claim 1 wherein said multicomponent feed gas mixture comprises hydrogen as the primary key component, carbon dioxide as the secondary key component and as tertiary gas component at least one gas from the group consisting of methane, carbon monoxide and nitrogen.

3. The method as defined in claim 2 wherein a carbonaceous solid adsorbent is employed in at least said first bed.

4. The method as defined in claim 2 wherein said rinsing of the first bed at substantially feed pressure level during step (b) above is effected in the same flow direction as that employed during initial introduction of the multicomponent feed gas mixture.

5. The method as defined in claim 4 wherein the effluent gas discharged during said rinsing step is added to the multicomponent feed gas mixture.

6. The method as defined in claim 2 wherein the purging of the said second bed at near ambient pressure during step (c) above using part of the primary key component is carried out in a direction opposite to that of initial passage of the multicomponent feed gas mixture into the said second bed.

7. The method as described in claim 2 wherein the desorbed gas during pressure reduction of said first bed as defined in step (c) above is recompressed to feed pressure level and recirculated as a rinse gas into another first bed of the system then undergoing rinsing as defined in step (b) above.

8. The method as defined in claim 7 wherein the said desorption step is carried out by flowing the gas in a direction opposite to that of the initial feed flow through the bed.

9. The method as defined in claim 2 wherein said evacuating of the first bed as recited in step (d) above is effected in a flow direction therein opposite to that of the initial feed gas flow therein.

10. The method as defined in claim 2 wherein said evacuating of the first bed defined in step (d) is effected by pulling vacuum at an intermediate level of said first bed.

11. The method as defined in claim 2 wherein final pressurization of a first and a second adsorbent bed to the initial superatmospheric feed pressure during step (f) above is effected by bringing a second bed in flow communication with a first bed, both of which are previously pressurized to the same intermediate pressure, and then flowing the primary key component into the said second bed in a flow direction opposite to that of the feed gas flow through those beds.

12. In a separation of a multicomponent feed gas mixture with the individual recovery of a primary key component and a secondary key component present in said mixture, by select sorption, wherein said secondary key component is more strongly sorbed than said primary key component and there is present in said mixture at least one minor dilute tertiary gas component less strongly sorbed than said secondary key component; the method which comprises effecting such select sorption in a defined system comprising a plurality of first sorbent beds (A) each having a feed end and an effluent end and which operate in parallel and in timed sequence and a plurality of second sorbent beds (B) each having a feed end and an effluent end and which also operate in parallel and in timed sequence, said first beds containing sorbent selective for preferential retention of said secondary key component and said second beds containing sorbent selective for retention of said tertiary component(s) as opposed to said primary key component; and wherein during a completed cycle each of said first beds (A) undergoes a successive sequence of steps comprising:

(a) passage of said multicomponent feed gas mixture therethrough at superatmospheric pressure in a selected positive flow direction; with discharge therefrom of an effluent gas stream composed of any unadsorbed portion of said feed gas mixture;

(b) discontinuing the passage of said feed gas mixture into said first bed and discharge of effluent therefrom, followed by rinsing said first bed at substantially initial feed gas pressure level by flow therethrough of secondary key component;

(c) after step (b) depressurizing said first bed to substantially atmospheric pressure level by gas withdrawal therefrom;

(d) after step (c) lowering said first bed pressure to subatmospheric level by evacuation;

(e) after step (d) repressurizing said first bed to an intermediate pressure level by flow thereinto of gas substantially free of the secondary key component wherein said repressurizing to an intermediate pressure level is effected in two sequential pressure equalization transfers, (i) during the initial of which pressure equalization transfers withdrawn gas from the feed end of a second bed (B) undergoing step (h) (iii) below is transferred into the feed end of said first bed thereby equalizing the pressure between the two beds involved in said initial pressure equalization transfer, and (ii) during the subsequent pressure equalization transfer withdrawn gas from the feed end of a second bed (B) undergoing step (h) (i) below is transferred into the feed end of said first bed thereby equalizing the pressure between the two beds involved in said subsequent pressure equalization transfer;

(f) and finally bringing said first bed to the initial superatmospheric feed pressure level by flow thereinto of substantially pure primary key component; and during the time period for such complete cycle undergone by each first bed (A), each of the second beds (B) undergoes twice in succession the steps of:

(g) receiving any previously unadsorbed effluent portion of said initial feed gas mixture discharging from a first bed undergoing step (a) above, with discharge therefrom of an effluent gas stream composed of the unadsorbed portion of said primary key component of said feed gas mixture;

(h) after discontinuing passage therein of said first bed effluent, lowering the pressure of said second bed by withdrawing a gas stream therefrom including void and desorbed gases, wherein said pressure lowering is effected in three sequential pressure equalization transfers, (i) during the first of which pressure equalization transfers withdrawn gas from the feed end of said second bed is transferred to the feed end of a first bed undergoing step (e) (ii) above thereby equalizing the pressure between the two beds involved in said first pressure equalization transfer, and (ii) during the second pressure equalization transfer withdrawn gas from the effluent end of said second bed is transferred to the effluent end of a second bed undergoing step (k) below thereby equalizing the pressures between the two beds involved in said second pressure equalization transfer, and (iii) during the third pressure equalization transfer withdrawn gas from the feed end of said second bed is transferred to the feed end of a first bed undergoing step (e) (i) above thereby equalizing the pressures between the two beds involved in said third pressure equalization transfer;

(i) after step (h) further depressurizing said second bed to near ambient pressure;

(j) after step (i) purging said second bed at near ambient pressure with primary key component;

(k) after step (j) partially repressurizing said second bed to an intermediate level by a pressure equalization transfer into the effluent end of said second bed of withdrawn gas from the effluent end of a second bed undergoing step (h) (ii) above, thereby equalizing the pressures between the two beds involved in said pressure equalization transfer;

(l) and finally introducing substantially pure primary key component product into said second bed to bring said second bed to the initial superatmospheric feed pressure level.

13. The method as defined in claim 12 wherein said feed gas mixture contains hydrogen as the primary key component, carbon dioxide as the secondary key component, and as tertiary component at least one gas from the group consisting of methane, carbon monoxide and nitrogen.

14. The method as defined in claim 13 wherein said defined system is comprised of six first beds (A) and three second beds (B) each of said second beds (B) being connected in flow communication with a first bed (A) during at least step (1) to permit gas flow from the second bed to the first bed with which the second bed is in flow communication.

* * * * *